(12) United States Patent
Dubrovin et al.

(10) Patent No.: US 9,673,958 B2
(45) Date of Patent: Jun. 6, 2017

(54) INFORMATION TRANSMISSION NETWORK AND NODE

(71) Applicants: Thales, Neuilly sure Seine (FR); Systemes Embarques Aerospatiaux, Paris (FR)

(72) Inventors: Alexis Dubrovin, Meudon la Foret (FR); Olivier Le Borgne, Meudon la Foret (FR); Augustin Mignot, Meudon la Foret (FR); Paul Ortais, Meudon la Foret (FR)

(73) Assignee: THALES, Paris (FR)

( * ) Notice: Subject to any disclaimer, the term of this patent is extended or adjusted under 35 U.S.C. 154(b) by 0 days.

(21) Appl. No.: 14/379,243

(22) PCT Filed: Feb. 14, 2013

(86) PCT No.: PCT/EP2013/053030
§ 371 (c)(1),
(2) Date: Apr. 2, 2015

(87) PCT Pub. No.: WO2013/120977
PCT Pub. Date: Aug. 22, 2013

(65) Prior Publication Data
US 2015/0215106 A1    Jul. 30, 2015

(30) Foreign Application Priority Data

Feb. 16, 2012 (FR) ...................... 12 00458

(51) Int. Cl.
*H04L 5/14*         (2006.01)
*H04L 12/437*       (2006.01)
*H04L 12/933*       (2013.01)

(52) U.S. Cl.
CPC ............ *H04L 5/14* (2013.01); *H04L 12/437* (2013.01); *H04L 49/15* (2013.01)

(58) Field of Classification Search
CPC ....................................................... H04L 5/14
See application file for complete search history.

(56) References Cited

U.S. PATENT DOCUMENTS

| 5,933,258 A * | 8/1999 | Flanagan ............. H04B 10/032 370/222 |
| 2006/0143345 A1* | 6/2006 | Fredriksson .............. G06F 1/14 710/106 |
| 2006/0215671 A1* | 9/2006 | Ortais ................... G06F 13/385 370/401 |

FOREIGN PATENT DOCUMENTS

FR            2857805 A1    1/2005

\* cited by examiner

*Primary Examiner* — John Blanton
(74) *Attorney, Agent, or Firm* — Thompson Coburn LLP; Benjamin L. Volk, Jr.

(57) ABSTRACT

This network comprising functional nodes connected in series by information transmission means, in which the information assumes the form of discrete messages propagating from node to node in the network, is characterized in that the information transmission means for transmitting information between the nodes are bidirectional so as to allow information to propagate in both directions of flow of the network, and each node includes at least one first and one second associated port, for information input/output, connected to adjacent nodes by corresponding information transmission means and the operation of which is controlled by communication automaton means, between an operating mode for the asynchronous reception of information from its adjacent nodes and an operating mode for the synchronous transmission of information to the nodes adjacent thereto, and in that the communication automaton means are suitable for triggering the activation of the communication of information from the node to its adjacent nodes following the beginning (71, SOF) of the reception of information from each of them.

4 Claims, 9 Drawing Sheets

INFORMATION TRANSMISSION NETWORK AND NODE

CROSS REFERENCE TO RELATED APPLICATIONS

This application is a 35 U.S.C. §371 application of PCT/EP2013/053030, filed Feb. 14, 2013, which claims the benefit of priority to French Application No. 1200458, filed Feb. 16, 2012, each of which is incorporated herein by reference in its entirety.

The present invention relates to a data transmission network and a corresponding programmable network node.

More specifically, the invention relates to such a network that includes functional nodes connected in series by data transmission means, in which the data assumes the form of discrete messages propagating from node to node in the network.

An information transmission method and device are already known from document FR-A-2,857,805.

BACKGROUND OF THE INVENTION

Such a method and such a system are for example implemented in a closed system of onboard computers, for example in an air or land vehicle.

The method described in this document includes a step for point-to-point information transmission between two transmission nodes, for example via a wired network, each node having one or more channels each authorizing the transmission with a single node, an information conversion step for the transmission thereof, for example in series, and the computer of each of the nodes responds to the reception of a message by an unconditional transmission that propagates the information streams along closed chains, the control of information streams then being implicitly determined by the cabled topology used, and the transmission between nodes uses an asynchronous or isochronous mode.

While basing itself on the use of such a network in which functional nodes are connected in series by information transmission means, the invention seeks to optimize a certain number of features of those networks, for example their reliability, their throughput, the handling of failure modes, etc.

Documents EP 2093941, DE 4113613, DE 102009001081, WO 00/13098 and U.S. Pat. No. 5,933,258, which pertain to transmission networks in which improvements have been made to optimize their operation, can be cited to that end.

SUMMARY OF THE INVENTION

To that end, the invention relates to a data transmission network, of the type including functional nodes connected in series by data transmission means, in which the data assumes the form of discrete messages propagating from node to node in the network, characterized in that:

the means for transmitting data between the nodes are bidirectional to allow data to propagate in both circulation directions of the network, each node includes at least one first and one second associated port, for information input/output, connected to adjacent nodes by corresponding information transmission means and the operation of which is controlled by communication automaton means, between an operating mode for the asynchronous reception of information from the adjacent nodes, and an operating mode for the synchronous transmission of information to the nodes adjacent thereto, and in that the communication automaton is suitable for triggering the activation of the communication of information from the node with its adjacent nodes following the beginning of the reception of information from each of them and the network is ready.

According to other features of the network according to the invention considered alone or in combination:

BRIEF DESCRIPTION OF THE DRAWINGS the part of the information whose reception triggers the activation of the communication is formed by a message start of frame (SOF) signal.

According to another aspect, the invention also relates to a corresponding network node.

The invention will be better understood using the following description, provided solely as an example and done in reference to the appended drawings, in which:

FIG. 1 shows a block diagram illustrating the general structure of functional nodes connected in series in an information transmission network according to the invention, FIG. 2 shows a block diagram illustrating the general structure of an example embodiment of a node included in the composition of a transmission network according to the invention, FIGS. 3 and 4 illustrate the general operating principle of an information transmission network according to the invention, FIG. 5 illustrates the switching of the operation of a node between its reception mode and its transmission mode, FIG. 6 provides a detailed illustration of a register structure included in the composition of a node, FIG. 7 illustrates the normal operation of a node included in the composition of a network according to the invention, FIG. 8 shows a downgraded operating mode of the transmission network according to the invention, FIG. 9 illustrates the structure of a node including more than two information input and output ports, FIG. 10 illustrates an example embodiment of a network formed from nodes, and FIG. 11 illustrates an example embodiment of a message frame format used in a transmission network according to the invention;

DETAILED DESCRIPTION OF THE INVENTION

Figure 1:
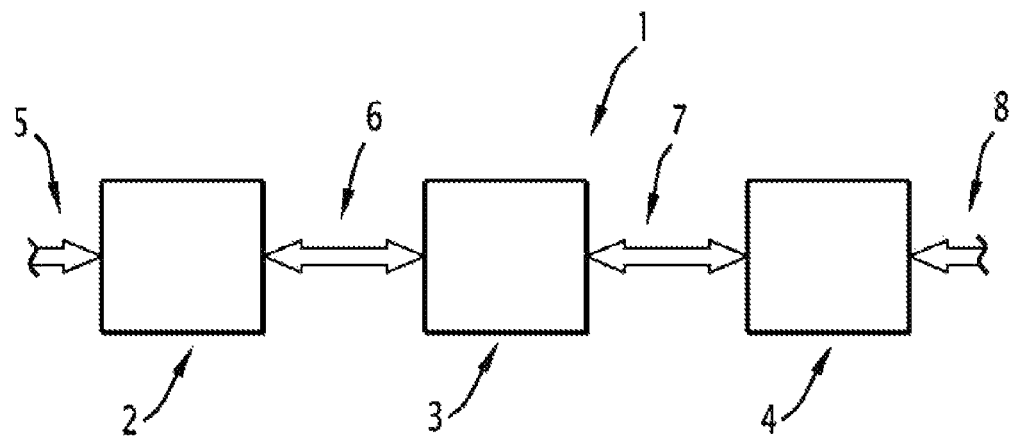

FIG. 1 in fact illustrates an example embodiment of a portion of an information transmission network that includes functional nodes connected in series by information transmission means.

In this FIG. 1, the network is designated by general reference 1 and, in the described example, includes three nodes designated by references 2, 3 and 4, respectively. These functional nodes are therefore connected in series by information transmission means for example designated by references 5, 6, 7 and 8, respectively.

These information transmission means can be based on wired transmission means for example formed by pairs of twisted wires or coaxial or other cables.

However, other embodiments may be considered, for example the use of optical fibers, or others, as well as wireless connecting means, for example acoustic.

This network is then suitable for transmitting information that assumes the form of discrete messages propagating from node to node in the network.

In the transmission network according to the invention, the information transmission means between the nodes are bidirectional to allow information to propagate in both circulation directions of the network.

Figure 2:
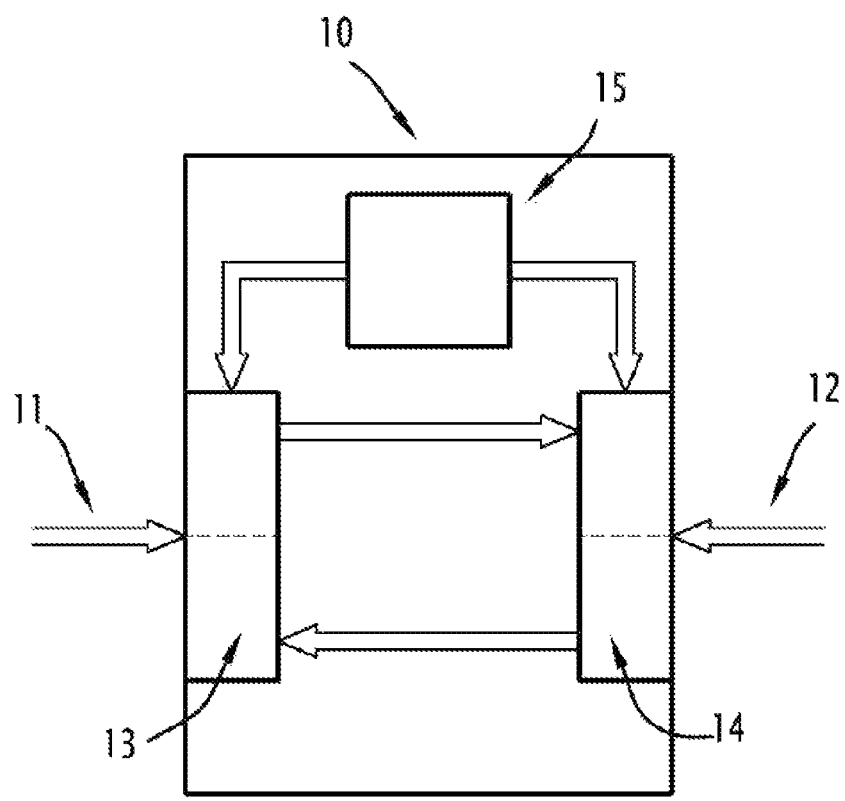
Figure 3:
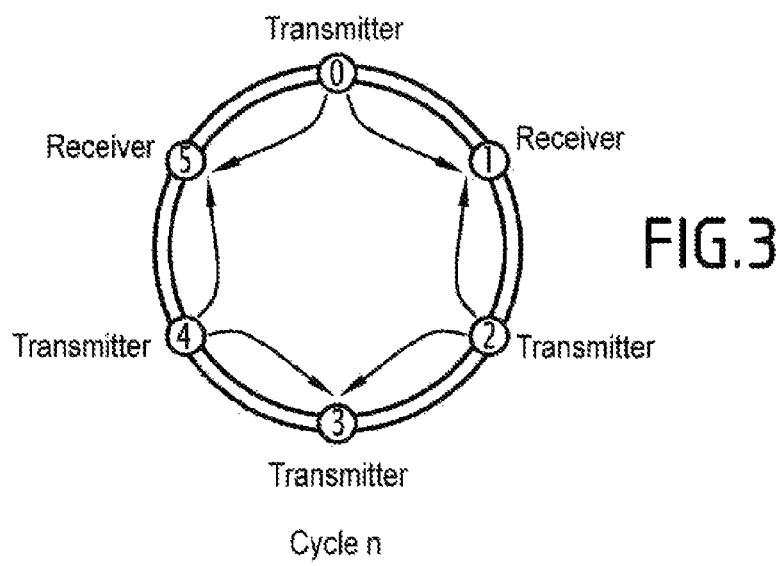
Figure 4:
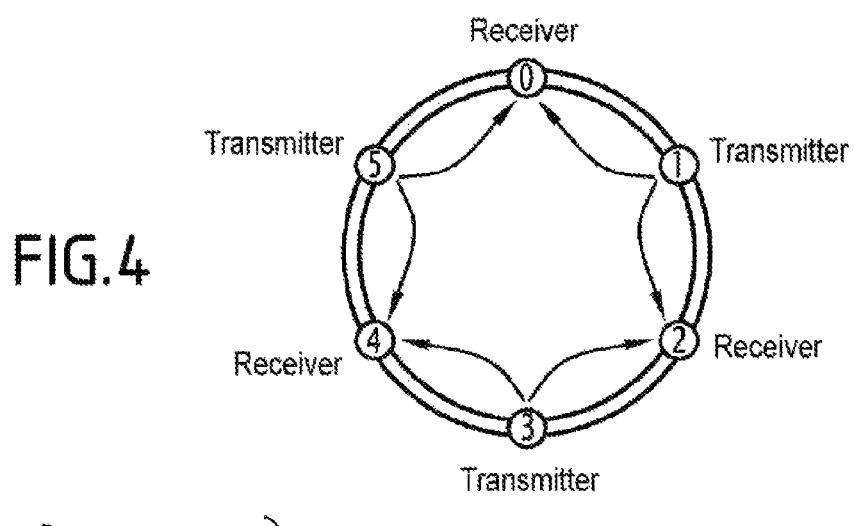

Such an operation is for example illustrated in FIGS. 2, 3 and 4.

FIG. 2 shows an example embodiment of a node included in the composition of such a network, that node being designated by general reference 10.

That node is then for example connected by means of two information transmission means 11 and 12, respectively, to adjacent nodes in the network.

In fact, each node includes at least one first and one second associated port for the input/output of information, for example designated by general references 13 and 14 in this FIG. 2, connected by the corresponding information transmission means 11 and 12, respectively, to the adjacent nodes in the network. The operation of these associated information input/output ports is then controlled sequentially and exclusively, via communication automaton means designated by general reference 15, between an operating mode for the asynchronous reception of information from the adjacent nodes and an operating mode for the synchronous transmission of information to the neighboring nodes.

One can thus see that, related to a network like that illustrated in FIGS. 3 and 4, in which the nodes are for example connected in a closed loop, each node switches exclusively and sequentially, between an operation transmitting information to its adjacent nodes, which are then in the reception operating mode, and an operation receiving information from its neighbors, which are then in the transmission operating mode.

FIGS. 3 and 4 in fact illustrate two successive cycles n and n+1, allowing the nodes to transmit the information in the network.

Figure 5:
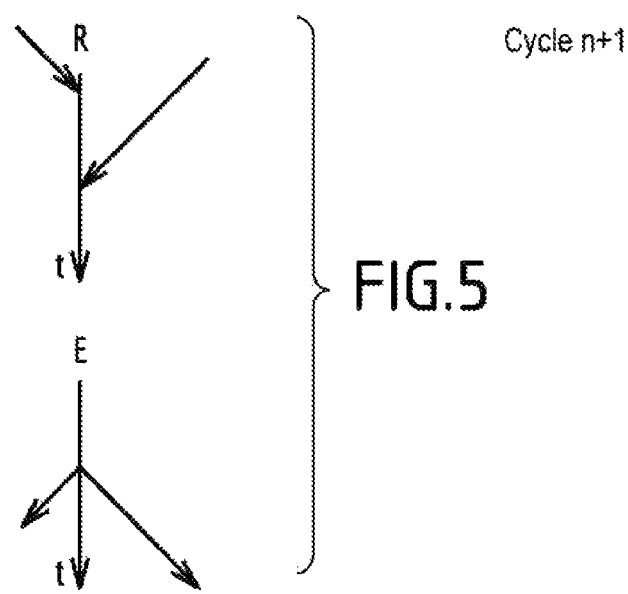

In fact, and as illustrated by FIG. 5, for each node, the switching between the reception mode R and the transmission mode E is activated by the communication automaton once the corresponding node has received information from its neighbors. The expression "operating mode for the asynchronous reception of information from its adjacent nodes" is used in this sense.

Once information is received from its neighbors, the communication automaton then switches the corresponding associated ports of the node to their transmission operating mode, all of the ports associated with the node then going into the mode for the transmission of information to the adjacent nodes. The expression "operating mode for the synchronous transmission of information to the adjacent nodes" is used in this sense.

In fact, the communication automaton is suitable for switching all of the ports associated with the node from their reception operating mode to their transmission operating mode after, for each of them, either the reception of valid information, or the expiration of a predetermined length of time for the non-reception of valid information.

In the other direction, the communication automaton is suitable in return for switching each of the associated ports from its transmission operating mode E to its reception operating mode R, after the end of transmission of the information by the port.

One can then see that this makes it possible to avoid any collision of messages on the information transmission means, inasmuch as adjacent nodes cannot transmit at the same time on the information transmission means connecting them to one another.

As indicated in the aforementioned prior document, this makes it possible to avoid the use, in the nodes, of extremely heavy means for managing collisions on the network, which results in a very significant simplification thereof.

Figure 6:
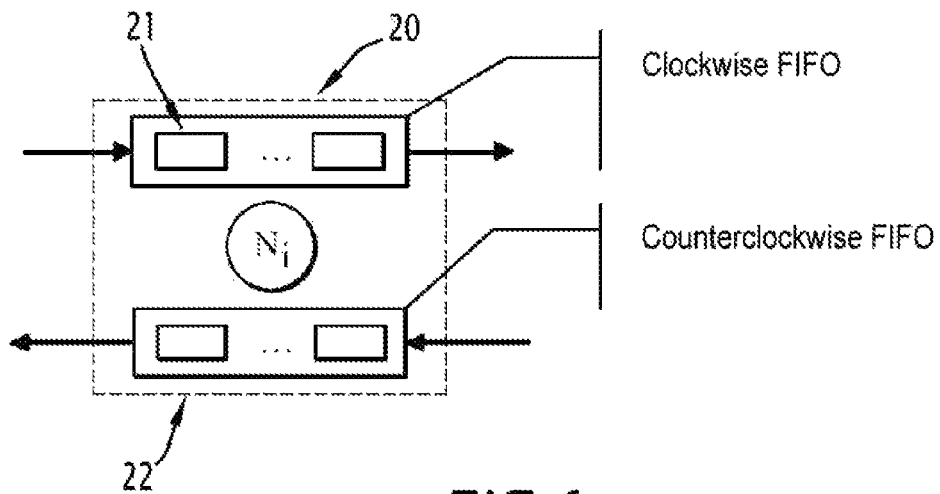

One example embodiment of such a node is illustrated in FIG. 6.

In fact, the node illustrated in that figure is designated by general reference 20, and the ports associated therewith for example comprise means in the form of "First In-First Out" (FIFO) registers, mounted head-to-tail between the information transmission means connecting that node to its neighbors.

Of course, any other structure using first-in-first-out logic buffer means can also be used.

These FIFO register means are designated by general references 21 and 22.

One of these means then makes it possible to transmit the information in one direction and the other in the other direction of the network. These register means in fact receive information coming from a node to transmit it by propagating it to the other adjacent node, and vice versa.

Figure 7:
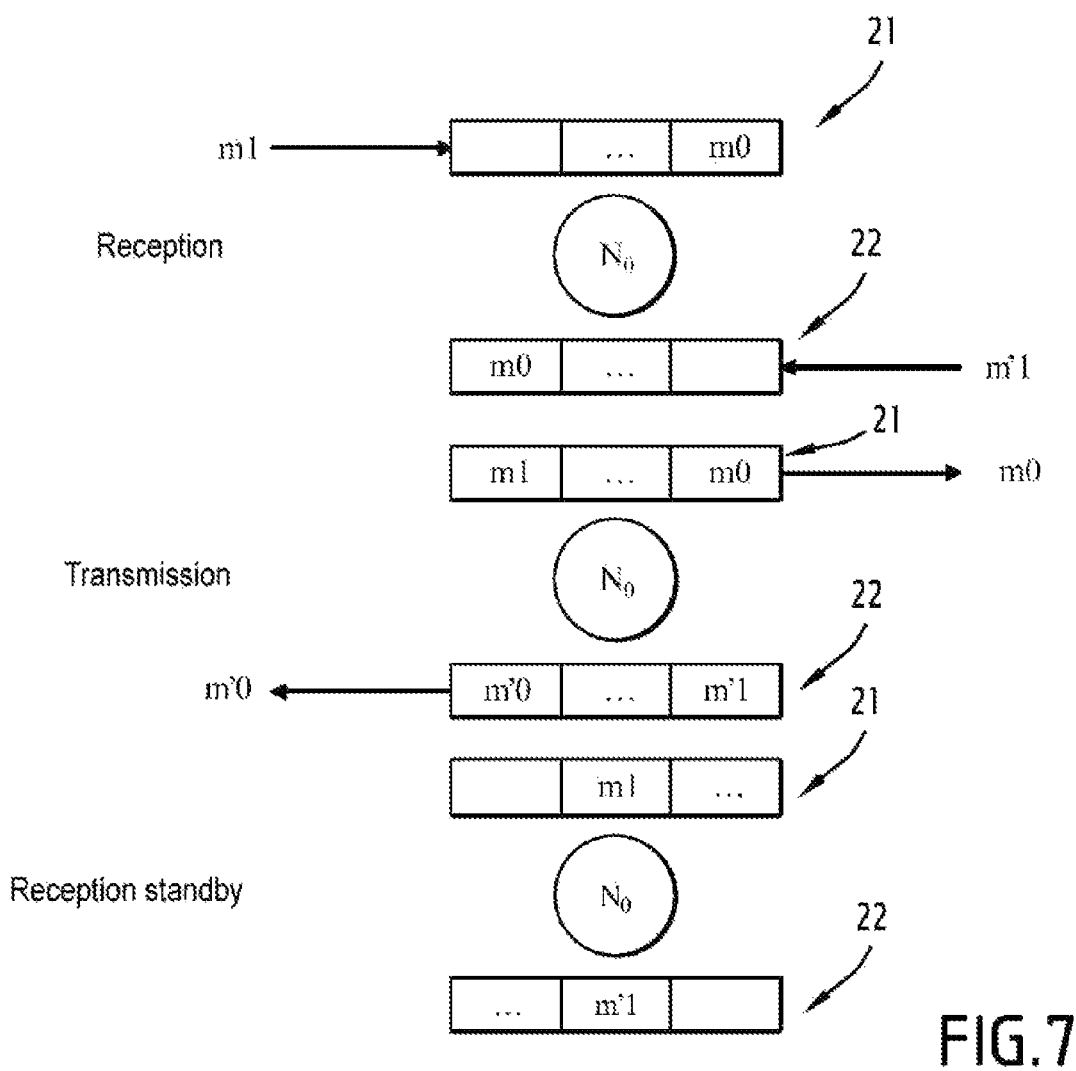

The operation of such a node is illustrated in FIG. 7.

This figure in fact shows the registers 21 and 22 previously described in their different states based on the state of the node under the control of the communication automaton.

The first state illustrated in the top part of this figure is the state of the node for the reception of information.

Each FIFO register means 21, 22 already has, in memory, a message previously received and designated by m0 and m'0 for the messages circulating in either direction of that network.

In the state illustrated in the upper part of the figure, the node is in the operating mode for receiving subsequent messages, for example messages m1 and m'1.

Once the two messages m1 and m'1 have been received, the node, as previously described, goes under the control of the communication automaton, in the mode for transmitting preceding messages, i.e., m0 and m'1, which are then transmitted to the corresponding adjacent nodes.

This state is illustrated in the middle part of FIG. 7.

In the bottom part of this FIG. 7, the messages m0 and m'0 have been transmitted such that the node then enters standby while awaiting the reception of messages from its neighbors, and so forth.

One can then see that the messages are placed in a queue and are transmitted once new messages are received.

As previously indicated, in the nominal operating case of this network, i.e., when all of the nodes and all of the information transmission means are operational, the network then allows a complete circulation of information in both circulation directions of the messages on the network.

Thus for example, and in the case where the network is made up of nodes connected in a closed loop, the network can then be likened to two logic rings in which messages circulate.

Figure 8:
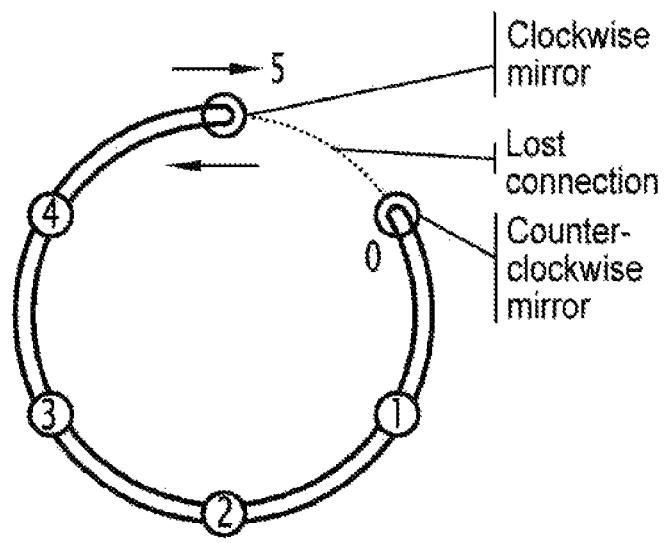

If one of the information transmission means is lost between two adjacent nodes, as illustrated in FIG. 8, the communication topology is modified to restore a single ring.

In that case, the end nodes of the branch thus formed are suitable for operating in mirror mode returning information to be transmitted to the adjacent node.

This is then done by controlling the corresponding ports of those nodes using the corresponding communication automaton means. These automaton means then detect that malfunction and command switching of the ports into mirror mode.

Figure 9:
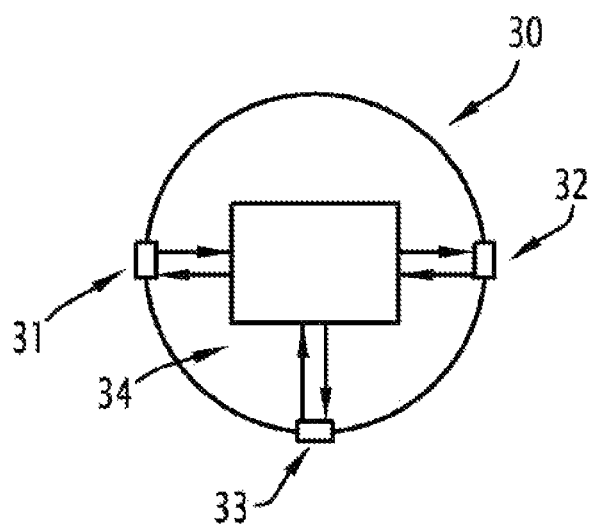

As previously indicated, nodes of the network may also include more than two associated input/output ports, like that illustrated in FIG. 9.

The node shown in this figure, and designated by general reference 30, then for example includes three or more associated ports designated by references 31, 32 and 33, optionally associated with information routing means 34.

Figure 10:
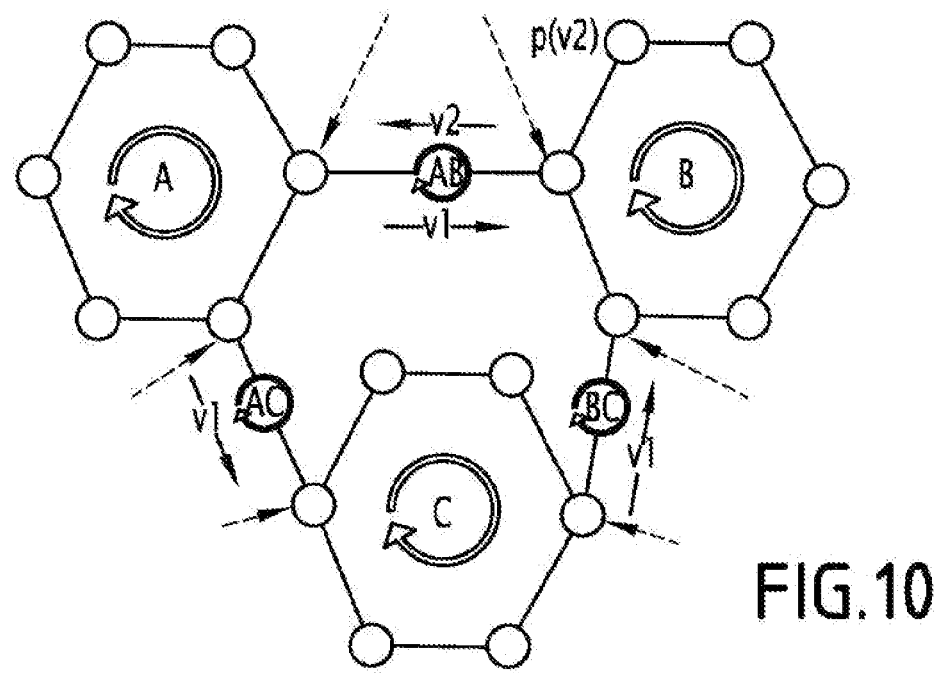

This then makes it possible to multiply the number of possible network configurations with such nodes, as illustrated in FIG. 10, where one can see that nodes may be connected in a closed loop by corresponding information transmission means.

Furthermore, nodes may also be connected by information transmission means in at least one branch whereof the end nodes are suitable for operating in their mode returning information to the transmitting adjacent node, or in connecting branches of other nodes connected in a closed loop by information transmission means.

Of course, other configurations may also be considered.

Figure 11:
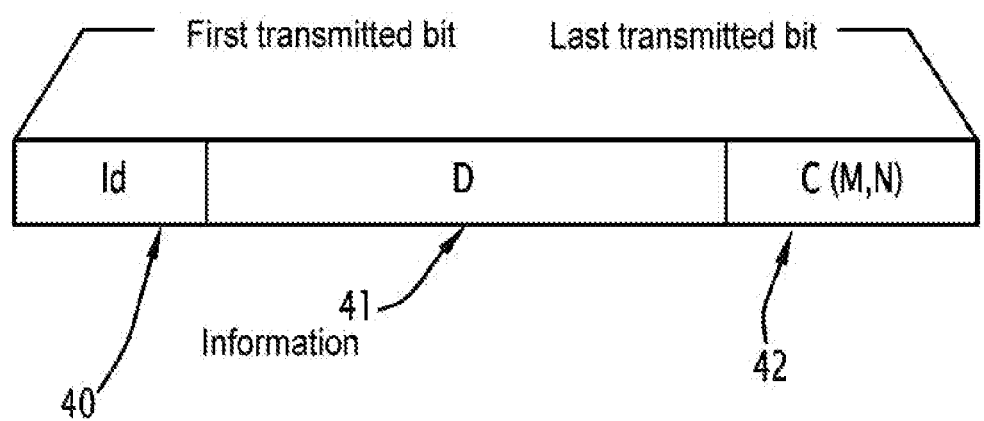

Lastly, FIG. 11 shows one possible example embodiment of a message format, that format traditionally including a message header 40, information 41 and a control portion designated by general reference 42.

To that end, it may be noted that at least some nodes may also include means for generating error information intended to be transmitted in case of non-reception of valid information from a neighboring node in a predetermined length of time.

Likewise, at least some of these nodes may also include, traditionally in this type of application, means for generating service information intended to be transmitted on the network.

Several other features of the information transmission network and implemented means may be noted. Thus:

The information transmission means may include a serial or parallel connection between the nodes.

The information transmission means may include a half or full duplex physical support between the nodes, i.e., using a same support in both information circulation directions on the network or one support per direction, respectively.

The information transmission means may choose a physical layer chosen from the group comprising: a RS422, RS 485, Flexray, LIN, CAN, ARINC429, BD 429, ARINC629, Safebus, Ethernet, ARINC859, ATM, MIL-STD-1553, Digibus, ASCB, Spacewire, SCI, SPI, I2C, PCI, PCIexpress, Fibre Channel, Firewire, USB and FDDI network.

The information transmission means may use message formats chosen from the group comprising the following frame formats: Flexray, LIN, CAN, TTP, ARINC429, ARINC629, Safebus, Ethernet, ATM, MIL-STD-1553, Digibus, ASCB, Spacewire, SCI, I2C, PCI, PCIexpress, Fibre Channel, Firewire, USB and FDDI.

Said ports associated with the node are for example associated by the communication automaton means. These communication automaton means then receive corresponding programming information for the association of ports, for example by the network directly, by an external channel separate and/or independent from that network, or from local storage means thereof, for example integrated into the communication automaton means or more generally, the corresponding node (FPGA bitstream, etc.).

Of course, still other embodiments may be considered.

Thus for example, FIGS. 12, 13, 14 and 15 illustrate different example embodiments of power supply means for such a network.

The illustrated example is the case of a so-called power supply on information, also known as "Power On Data".

In these figures, the network is designated by general reference 50 and for example includes six nodes 52, 53, 54, 55 and 56, respectively, connected in series by bidirectional information transmission means allowing information to propagate in both circulation directions of the network.

Figure 12:
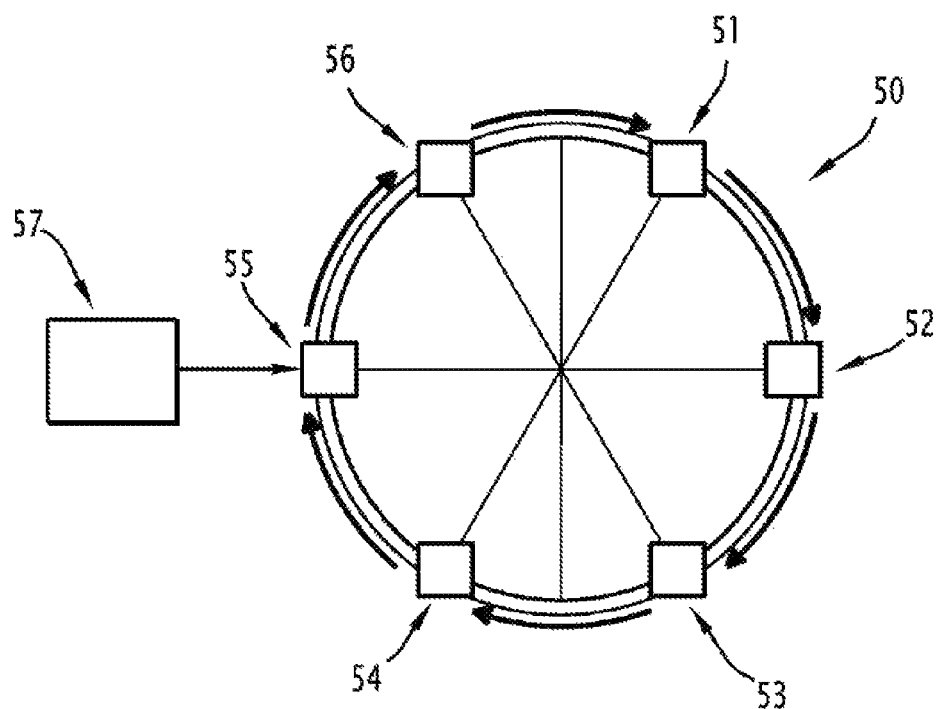
FIGS. 12 to 15 illustrate different example embodiments of power supply means for a network according to the invention.

In the network illustrated in these figures, and in particular in FIG. 12, the means for transmitting information between the nodes are wired means, which also serve as an electricity supply grid for the nodes from at least one of the nodes of the network, for example the node designated by general reference 55.

The electrical power supply then propagates from node to node in both directions of the network, for example from a power supply source 57 connected to that node 55, to power the other nodes of the network.

Of course, other embodiments may be considered and the or each power supply node can be connected to several power supply sources, such as an onboard power grid for example onboard an aircraft or a vehicle and a battery, for example a backup battery, allowing a backup operating mode.

Figure 13:
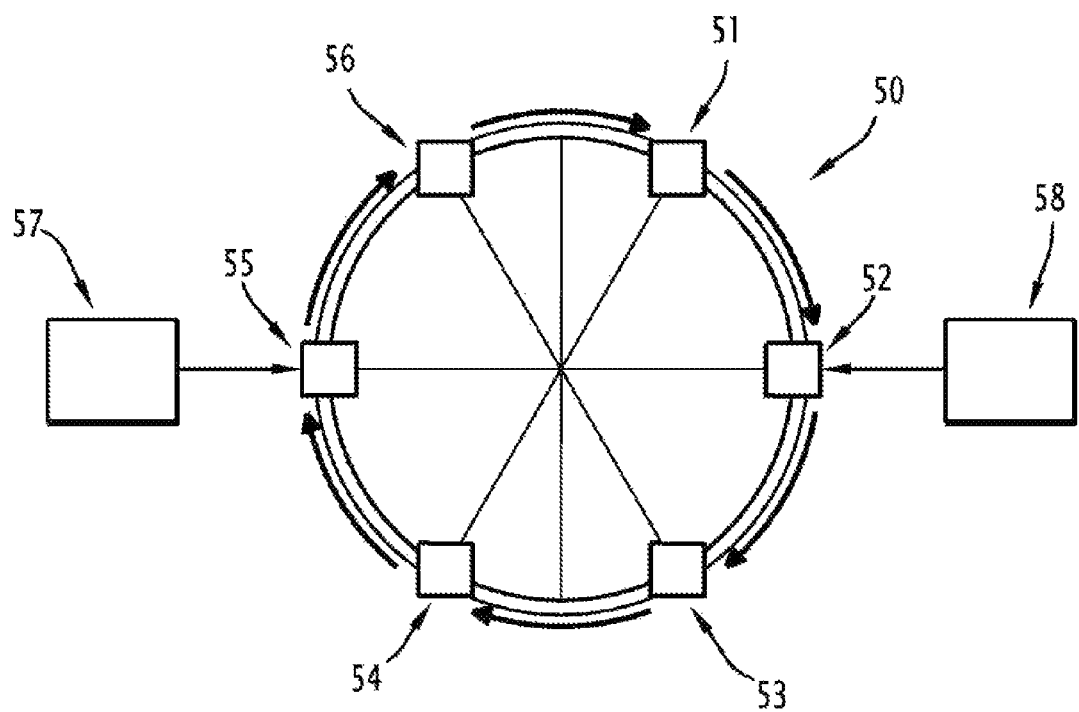

Of course and as illustrated in FIG. 13, several nodes, such as the nodes 52 and 55, can be connected to at least one outside electricity source, such as the source designated by general reference 58 for the node 52 and that designated by reference 57 for the node 55.

These nodes connected to the power supply source can be remote from one another in the network.

One can thus see that at least two nodes of the network 52 and 55, for example, are connected to at least two different power supply sources 57 and 58 for example, which makes it possible to provide a continuous power supply of the network from a node and a power source.

Figure 14:
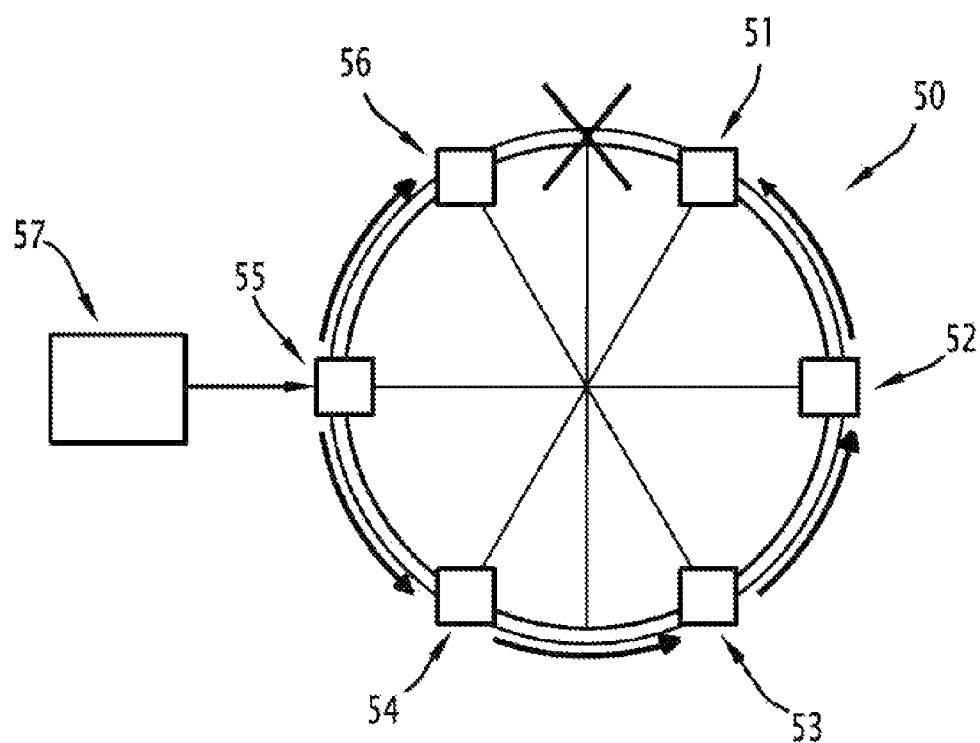
Figure 15:
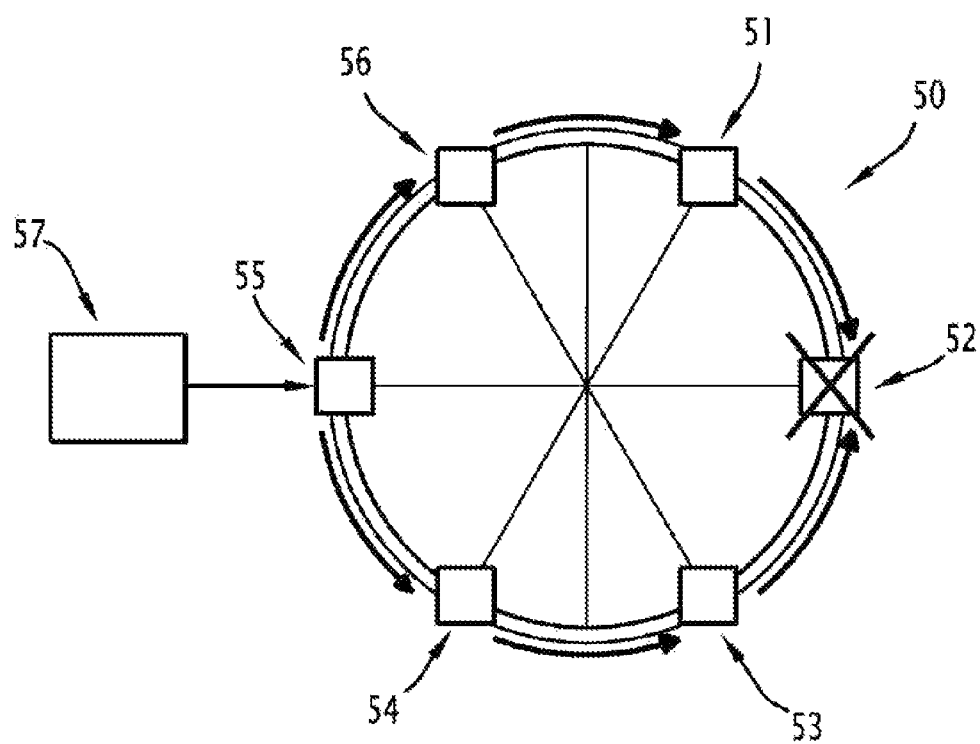

In fact and as for example illustrated in FIGS. 14 and 15, if one of the connections between two nodes is lost, as illustrated in FIG. 14 between the nodes 51 and 56, or if a node is lost as illustrated in FIG. 15 for the loss of the node 52, the electricity supply for the rest of the network, and therefore the other nodes thereof, is provided by the rest of the loop, that power supply being present on each side of the faulty member.

This then makes it possible to ensure very high operating reliability of the network according to the invention.

It will also be noted that in order to still further improve this safety, the nodes themselves may include integrated electricity storage means, for example capacitors or other means, rechargeable by the power supply of the network and making it possible to provide backup operation thereof.

This backup operation may for example consist of an information backup, an attempt to reestablish a communication, a reset attempt, etc., and may in particular be useful during reconfiguration phases of the power supply grid so as not to interrupt the circulation of the information.

Of course, still other embodiments may be considered.

As illustrated and described relative to FIG. 5, the communication automaton means can be suitable for switching the ports associated with the node from their reception operating mode to their transmission operating mode after, for each of them, either the reception of valid information, or the expiration of a predetermined length of time for the non-reception of valid information.

Figure 16:
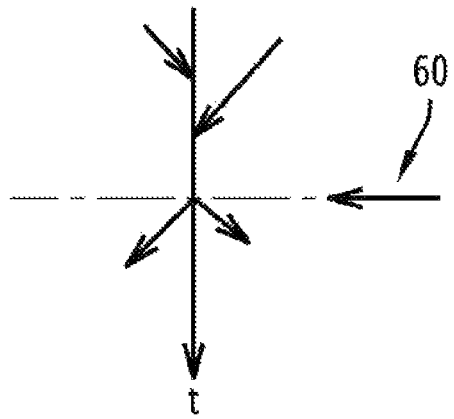
FIGS. 16 to 18 illustrate different operating modes of a network according to the invention.
Figure 17:
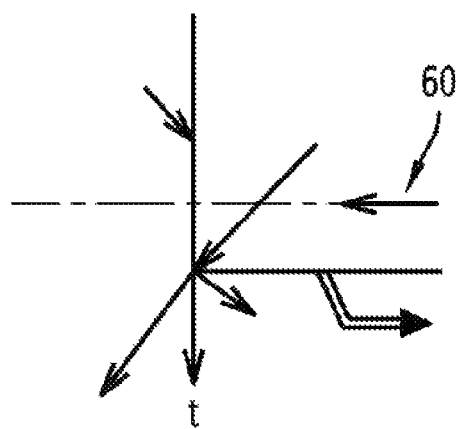
Figure 18:
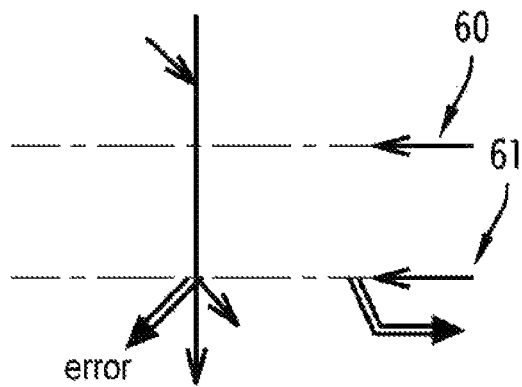

According to another embodiment, additional information can be taken into account by the communication automaton means can cause that switch, as illustrated in FIGS. 16, 17 and 18.

In these figures, this specific operating mode is in fact illustrated, in which the communication automaton means are suitable for switching all of the ports associated with the node from their reception operating mode to their transmission operating mode after, for each of them, either the reception of valid information and the reception of a timing signal internal to the node, or the expiration of a predetermined length of time for the non-reception of valid information.

In these figures, the internal timing signal of the node is designated by general reference 60 and the expiration moment of the predetermined time period is designated by reference 61.

As illustrated in FIG. 16, in the event valid information has been received by each port of the node, the communication automaton means then wait to receive the internal timing signal 60 to activate the transmission operating mode.

In FIG. 17, another operating example is illustrated in which the internal timing signal, still designated by general reference 60, has occurred after receiving information on one of the ports of the node, but before receiving information on the other port of that node.

In that case, the communication automaton means activate the switching of the ports associated with the node, from their reception operating mode to their transmission operating mode upon receiving information from the other port of the node, inasmuch as it has already received information on the first port and it has also received the internal timing signal.

FIG. 18 illustrates the case where information has not been received on one and/or the other of the ports of the node before the expiration of the predetermined time period for the non-reception of valid information 61.

In that case, for example, an error message is emitted.

It will also be noted that the internal timing signal may be subjugated to the transmissions (FIG. 17) or the expiration of the time period 61 (FIG. 18).

FIG. 11 diagrammatically shows one example of a frame of a message that may circulate in a network according to the invention.

Figure 19:
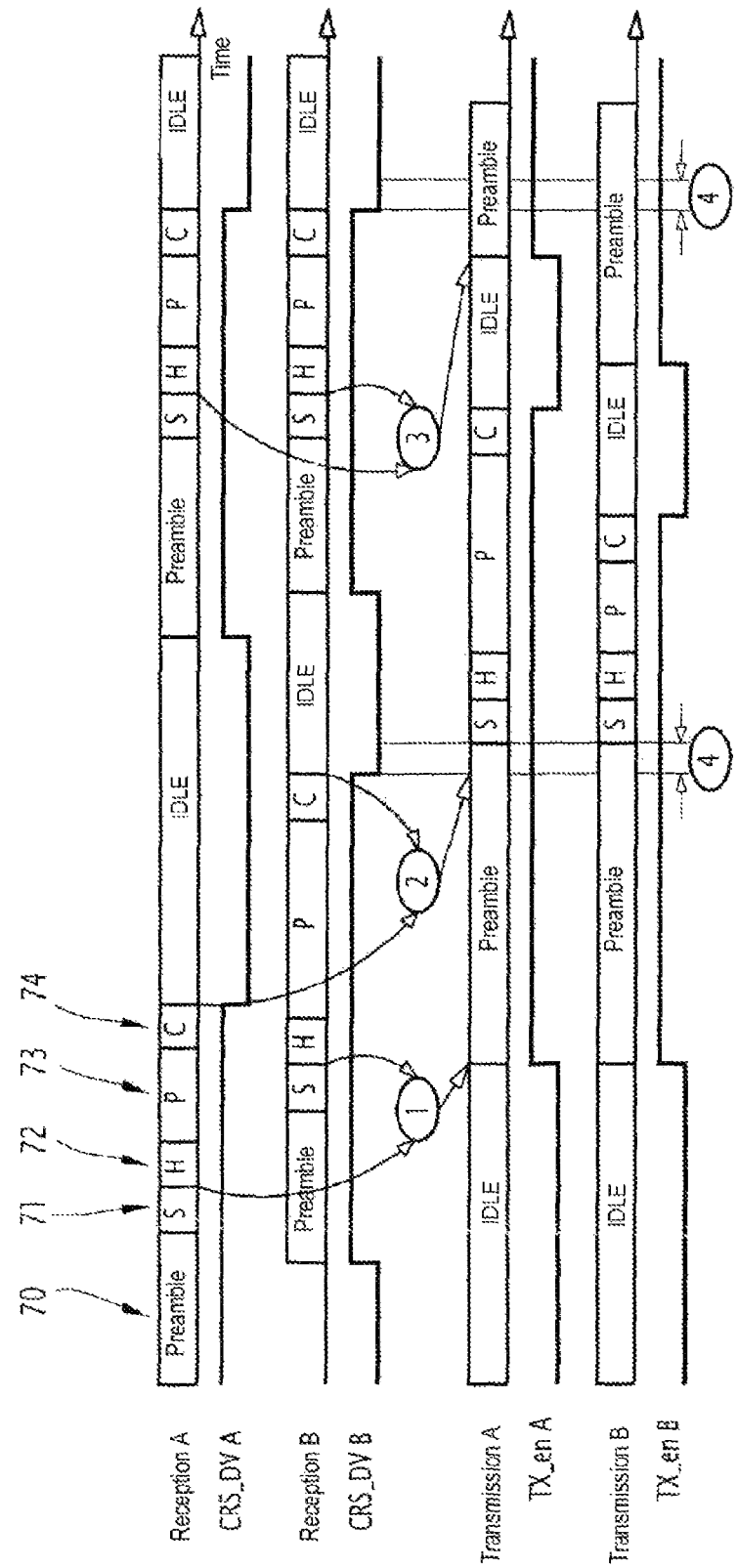
FIG. 19 illustrates the anticipation of the establishment of a communication in a network according to the invention.

One such frame is illustrated in much more detail in FIG. 19.

This figure in fact shows the signals passing over the two receiving ports, for example in reception A and reception B, and in transmission, for example in transmission A and transmission B.

In fact and as illustrated, the information that passes over the network assumes the form of messages that traditionally include a preamble 70, a start of frame (SOF or S) 71, a header (H) 72, a payload (P) 73 and a control word (CRC) 74.

The term "IDLE" refers to the reversal/inactivity time of the network.

This message structures are traditional and well known in the state of the art.

Analyzing the arrival of the signals in the corresponding node makes it possible to optimize the operation thereof.

Thus, for example, the communication automaton means can be adapted to trigger the activation of the communication of information from the node to its adjacent nodes after the beginning of reception of information from each of them.

Thus for example, in the case illustrated in FIG. 19, the communication automaton means of that node monitor the reception of information on the corresponding ports of that node in order, when the network is ready, i.e., in particular when the "IDLE" waiting time between frames has been respected and after having received the preamble portion and the start of frame portion 70 and 71, respectively, for example, on those two ports, to trigger the activation on each port of the communication of information from the node to its adjacent nodes, causing the preambles of the received messages to be retransmitted to those adjacent nodes synchronously.

Thus, as of the beginning of reception of the latest frame, such as the frame B for example in the illustrated case, it is possible to anticipate the transmission of the preambles of those messages to trigger the activation of the communication early.

This corresponds to the situation described by 1 in FIG. 19.

At the end of reception of the two frames A and B, it is then possible to begin the transmission of the start of frame signal S for the frames to be transmitted, as illustrated by situation 2 in that FIG. 19.

A situation is described in 3 in which it is not possible to anticipate the transmission of the preamble because the network is not ready, the "IDLE" waiting time between frames not being respected.

Figure 20:
FIG. 20 shows a network portion according to the invention illustrating a malfunction.

Lastly, FIG. 20 shows a network portion to illustrate a possible malfunction of a network according to the invention.

Thus for example and as previously indicated, each node is suitable for switching into mirror operating mode for returning information to the following adjacent node if a malfunction of a preceding adjacent node is detected by the communication automaton means of the current node.

Thus for example in FIG. 20, the current node is designated by general reference 80, the preceding node by general reference 81, and the following node by general reference 82 in the network. These nodes are connected by information transmission means.

Thus for example if the node 80, and more particularly if the communication automaton means thereof, detect a malfunction of the preceding node 81, the communication automaton means of the node 80 then cause that node 80 to switch to the mirror operating mode for returning the information to the following node 82.

Furthermore, the communication automaton means of the current node 80 can also be suitable for launching an operating defect diagnostic phase of the preceding node 81 and/or a phase for reestablishing the communication of information with that preceding node 81, detected as having an operating defect.

Thus for example, the communication automaton means can be suitable for carrying out one or more tests chosen from the group comprising the following tests/checks:
  integrity of the information,
  consistency of the information,
  length of the information,
  traffic density of the information, and/or
  dating of the information,
  sequencing consistency,
  aging.

Of course, other tests may also be considered.

One can then see that all of this has a certain number of advantages relative to the networks of the state of the art, in particular for detection of a faulty node by a health node or the guarantee that a faulty node will be isolated so that it cannot produce erroneous information passed on to the other nodes.

The invention claimed is:

1. An information transmission network, of the type including functional nodes connected in series by information transmission means, in which the information assumes the form of discrete messages propagating from node to node in the network, wherein:
- the means for transmitting information between the nodes are bidirectional to allow information to propagate in both circulation directions of the network,
- each node includes at least one first and one associated second port, for information input/output, connected to adjacent nodes by corresponding information transmission means and the operation of which is controlled by a communication automaton between an operating mode for the asynchronous reception of information from the adjacent nodes, and an operating mode for the synchronous transmission of information to the nodes adjacent thereto,
- the communication automaton is adapted to trigger the activation of the communication of information from the node to its adjacent nodes after the beginning of the reception of information from each of them and the network is ready, and
- the communication automaton is adapted to switch the operating mode of each port of the corresponding node to the operating mode for the synchronous transmission of previous messages received previously by the corresponding node after the reception by the corresponding node of at least one next message from one of its adjacent nodes.

2. The information transmission network according to claim 1, wherein the part of the information whose reception triggers the activation of the communication is formed by a message start of frame signal.

3. An information transmission network node designed for a network according to claim 2.

4. An information transmission network node designed for a network according to claim 1.

* * * * *